United States Patent [19]

Teter

[11] Patent Number: 5,406,380
[45] Date of Patent: Apr. 11, 1995

[54] FILM RECORDER WITH INTERFACE FOR USER REPLACEABLE MEMORY ELEMENT

[75] Inventor: James R. Teter, Minneapolis, Minn.

[73] Assignee: Management Graphics, Inc., Minneapolis, Minn.

[21] Appl. No.: 97,267

[22] Filed: Jul. 23, 1993

Related U.S. Application Data

[63] Continuation of Ser. No. 814,780, Dec. 30, 1991, abandoned.

[51] Int. Cl.$^6$ .............................................. H04N 9/79
[52] U.S. Cl. .................................... 358/332; 348/207; 348/97
[58] Field of Search ............... 358/332, 333, 344, 345, 358/346, 347, 348, 102, 140, 302, 93, 906, 909, 214, 209; 346/110 R, 161; 354/21; 355/40; 348/180, 189, 190, 191, 96, 207, 97

[56] References Cited

U.S. PATENT DOCUMENTS

| | | | |
|---|---|---|---|
| 3,864,708 | 2/1975 | Allen | 358/335 |
| 4,258,421 | 3/1981 | Juhasz et al. | 364/424.04 |
| 4,536,848 | 8/1985 | d'Entremont et al. | 358/332 |
| 4,688,105 | 8/1987 | Bloch et al. | 358/335 |
| 4,695,903 | 9/1987 | Serap et al. | 358/335 |
| 4,742,369 | 5/1988 | Ishii et al. | 358/906 |
| 4,754,334 | 6/1988 | Kiriz et al. | 358/244 |
| 4,794,460 | 12/1988 | Shiota | 358/332 |
| 4,939,581 | 7/1990 | Shalit | 358/332 |
| 4,978,982 | 12/1990 | Ishikawa et al. | 354/21 |
| 5,124,795 | 6/1992 | Brusaw | 358/191.1 |
| 5,159,458 | 10/1992 | Murata et al. | 358/909 |
| 5,175,416 | 12/1992 | Mansvelt et al. | 235/379 |

FOREIGN PATENT DOCUMENTS 56-109328 8/1981 Japan.
294893 4/1990 Japan.

Primary Examiner—Tommy P. Chin
Assistant Examiner—Thai Tran
Attorney, Agent, or Firm—Barry R. Lipsitz

[57] ABSTRACT

A film recorder includes a digital image generator and a central processing unit operatively associated with the digital image generator for controlling the generation of images output from the image generator for recording. A film transport is provided to carry a photographic film. An image output from the image generator is projected onto a film plane of the film transport. An interface provides a data path between the central processing unit and a user accessible receptacle provided in the film recorder. A user replaceable memory element is inserted into the receptacle for communication with the central processing unit via the data path. The user replaceable memory element can provide various features. It can contain color look up tables for new photographic film types. Credit balance information can be provided in the user replaceable memory element to enable a user to make a predetermined number of exposures using the film recorder. Diagnostic information can also be stored in the replaceable memory element. The film recorder can be upgraded to incorporate new features through the use of a new replaceable memory element.

10 Claims, 2 Drawing Sheets

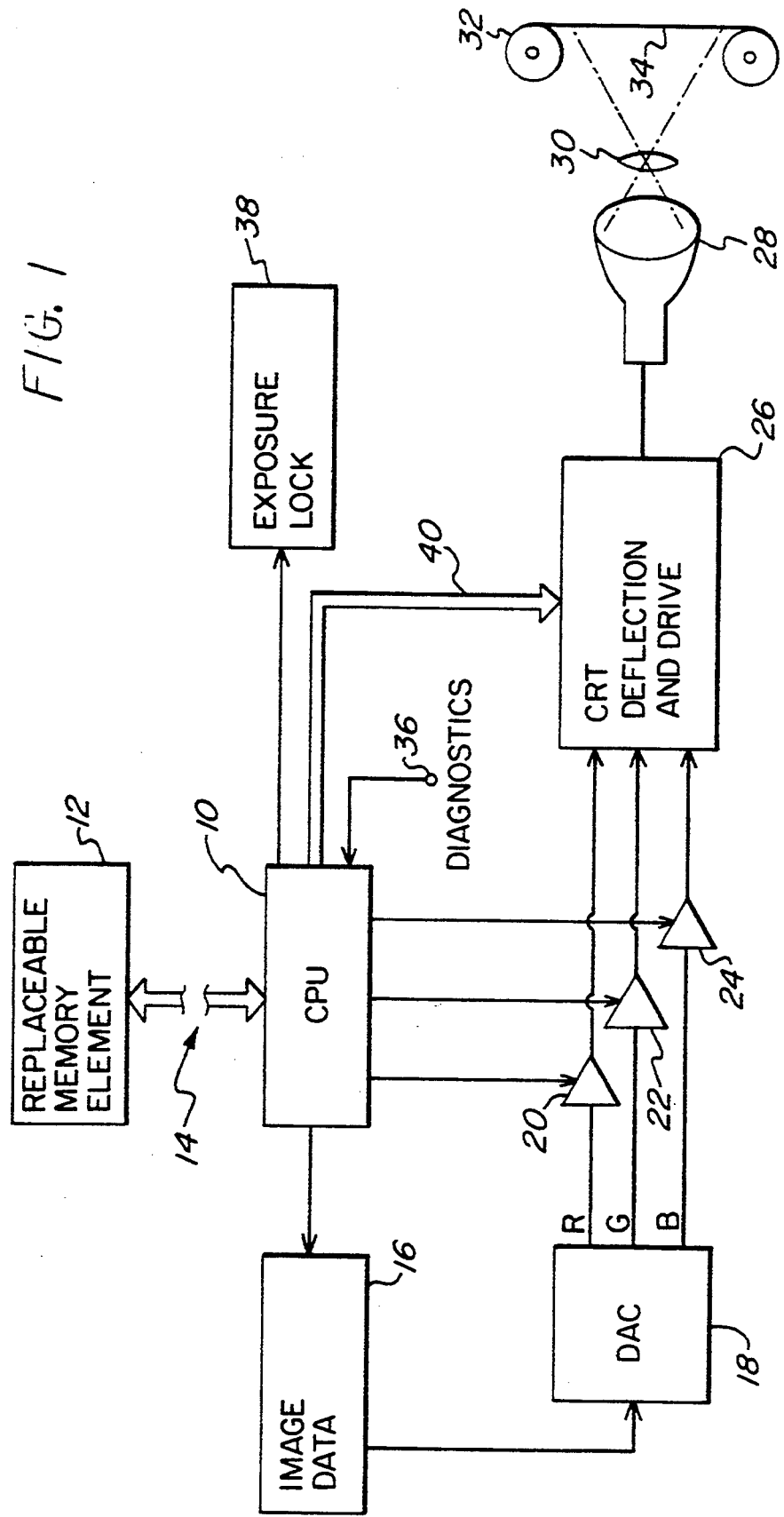

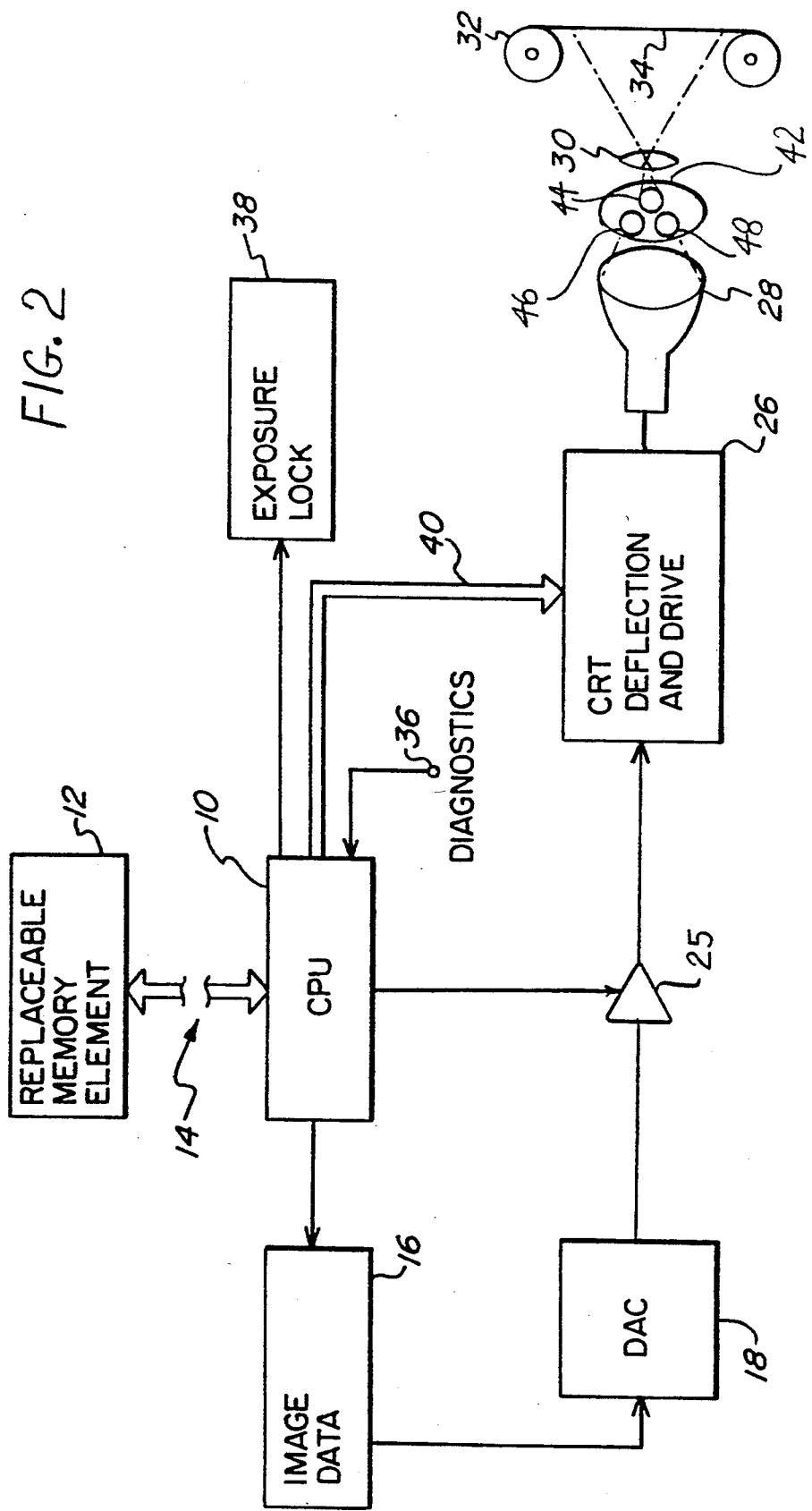

FILM RECORDER WITH INTERFACE FOR USER REPLACEABLE MEMORY ELEMENT

This application is a continuation of commonly assigned, U.S. patent application Ser. No. 07/814,780 filed Dec. 30, 1991, now abandoned.

BACKGROUND OF THE INVENTION

The present invention relates to film recorders for providing high quality computer generated graphic images on photographic film, and more particularly to a versatile film recorder having a user replaceable memory element containing color look up tables, exposure credit balances, diagnostic information, and/or data for providing new film recorder features or the like.

A film recorder is a photographic apparatus that uses photosensitive film. In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs, or the like. Alternatively, the images can comprise natural images acquired by a scanner or television camera for subsequent processing by a computer.

Known film recorders, such as those sold under the trademark "SOLITAIRE" by Management Graphics, Inc. of Minneapolis, Minn., U.S.A , typically include a light source such as a CRT for producing a beam, a deflection system for scanning the beam across the face of the CRT, a system control and central processor unit ("CPU") for controlling the deflection system, and a camera (i.e., "film transport"). The latter component may include a film transport body, lens, lens mounting assembly, aperture plate, film plate, and film transport mechanism. On a Solitaire film recorder, an image to be recorded is first written on the phosphor of the CRT by deflecting an electron beam in a raster pattern and modulating the intensity of the beam. This process is analogous to the creation of a television picture. Alternatively, the image can be written on the CRT using well known time modulation techniques, wherein the beam intensity is constant but the time the beam is kept at each point is varied depending on the exposure required.

The resulting pattern (the "object image") on the CRT is optically imaged onto photographic film by the film transport, which contains the required optics and mechanism to advance the film to successive frames. Other types of light sources can be substituted for the CRT in a film recorder. Examples include fiber optic sources, lasers, and focused light impinging a rotating drum wherein one or more rotations are completed for each scan line.

In order for the film recorder to accommodate different film types (e.g., size in millimeters, sprocket hole type and arrangement, film processing type, such as E6, C41, etc.) and speeds (i.e., light sensitivity), specific information is needed about the particular film being exposed. In addition, color balance information is required for each particular film so that the images the film produces when developed will have the proper color renditions. Different films usually have different and distinctive color dyes and spectral sensitivity characteristics which must be correctly exposed by the light sources in the film recorder in order to result in a properly balanced picture. The methods for achieving the exposure control are highly varied and specific to the technology used in the film recorder.

If a film recorder permits different types of film to be used, the operator must supply information identifying which film is currently being exposed. This has usually been accomplished through a selection means such as a switch setting. Alternatively, the information may be contained in a data file loaded to the film recorder from a computer. If the settings made to the film recorder do not match the actual film loaded in the device, incorrect exposure may result.

A problem arises when new film types are marketed which have different characteristics than prior films. In particular, each new film will generally have different color balance requirements, which have not been programmed into existing film recorders. In order go update existing film recorders to operate with new film types, it has been necessary for internal changes to be made to the film recorder hardware, firmware, and/or software. This has typically required the dispatching of a field technical representative to each customer site, for modification of the film recorder to accommodate the new film type.

It would be advantageous to provide apparatus for easily upgrading film recorders to accommodate new film types. In particular, it would be advantageous to provide a means for enabling users to update the color look up tables in a film recorder to add new film types. It would be further advantageous if such apparatus provided additional features not heretofore available in a film recorder. Such features include, for example, the provision of credit balance information, allowing a user a certain number of exposures on a film recorder, at which time an additional credit balance can be purchased and programmed into the film recorder by the user in a simple manner. It would be still further advantageous for such apparatus to allow the film recorder to store diagnostic information in a replaceable memory element, which can be dispatched back to the factory for analysis and maintenance purposes. Other features not otherwise available in a film recorder would also be advantageously provided by such apparatus.

The present invention provides a user replaceable memory element having the foregoing advantages for use in a film recorder.

SUMMARY OF THE INVENTION

In accordance with the present invention, a film recorder is provided having a digital image generator. A central processing unit operatively associated with the digital image generator controls the generation of images output from the image generator, e.g., via a scanning light source such as a laser or on a display. A film transport is provided, together with means for projecting an image from the image generator onto a film plane of the film transport. Interface means provide a data path between the central processing unit and a user accessible receptacle provided in the film recorder. A user replaceable memory element is adapted to be inserted into the receptacle for communication with the central processing unit via the data path. The user replaceable memory element can be a read only or read/write device, depending on the application.

The user replaceable memory element can provide any number of features. For example, it can contain a read only color look up table for a photographic film to be carried in the film transport. The central processing unit would access data in the color look up table to control the generation of an image output from the image generator.

The user replaceable memory element can be a read/write element that contains credit balance information, enabling a user to make a certain number of exposures on the film recorder, depending on a remaining credit balance. By accessing the credit balance information, the central processing unit can permit or deny a film exposure to a user. The central processing unit would decrement the credit balance contained in the user replaceable memory each time a film exposure is made.

The user replaceable memory element can comprise a read/write memory, into which the central processing unit can store diagnostic information for the film recorder. A user could periodically send the replaceable memory element to the manufacturer of the film recorder, for analysis of the film recorder's operation history. The diagnostic information can also be used to assist in the maintenance and repair of the film recorder.

Additional features can be provided in the film recorder by loading appropriate firmware into the user replaceable memory element. For example, as new film recorder features are conceived, existing film recorders can be upgraded to incorporate the new features by supplying users with a new replaceable memory element containing the necessary code to implement the new features. The existing central processing unit of the film recorder would communicate with the replaceable memory element to obtain the code and implement the new feature.

BRIEF DESCRIPTION OF THE DRAWING

FIG. 1 is a block diagram illustrating a film recorder control system in accordance with the present invention; and FIG. 2 is a block diagram illustrating a film recorder control system using a different scheme to control color balance.

DETAILED DESCRIPTION OF THE INVENTION

The figures illustrate pertinent portions of a film recorder control system in accordance with the present invention. A more detailed description of a film recorder control system is provided in commonly assigned U.S. Pat. No. 4,754,334, issued on Jun. 28, 1988 for "Image Recorder Having Automatic Alignment Method and Apparatus," incorporated herein by reference.

The control system illustrated in the figures includes a central processing unit ("CPU") 10 that controls various operations of the film recorder. In accordance with the present invention, a user replaceable memory element 12 is provided. Memory element 12 can comprise, for example, a programmable read-only memory ("PROM"), an electrically alterable read-only memory ("EAROM"), a nonvolatile random access memory device, such as a lithium battery operated smart card, a magnetic stripe memory, a flash memory device, or other relatively inexpensive, lightweight user replaceable nonvolatile memory device. An interface 14 provides a data path between CPU 10 and replaceable memory element 12. In the event that replaceable memory element 12 is a plug-in cartridge or card, interface 14 will comprise a hard wired data path from CPU 10 to a socket or other receptacle for receiving contacts on the replaceable memory element 12. In the event that replaceable memory element comprises a magnetic stripe memory, CPU 10 is hard wired via interface 14 to a conventional magnetic stripe card reader.

Regardless of the type of nonvolatile memory used for replaceable memory element 12, a receptacle will be provided in the film recorder that is easily accessible to a user. For example, an opening in the film recorder housing, such as a slot, can be provided to enable the user to insert the replaceable memory element. The slot will incorporate a socket or magnetic stripe reader, as necessary, to interface the replaceable memory element with CPU 10.

Replaceable memory element 12 can provide any number of functions. For example, it can contain one or more color look up tables for one or more photographic films. CPU 10 recovers the color look up table data from the replaceable memory element via interface 14, and uses this information in color balancing an image. Image data stored in image data memory 16 is output, in response to a command from CPU 10, to a digital-to-analog converter ("DAC") 18. DAC 18 outputs the red, green and blue color signals defining an image received from image data memory In the embodiment illustrated in FIG. 1, each of the red, green and blue signals is coupled to a respective intensity amplifier 20, 22, 24. The intensity amplifiers are independently controlled, by CPU 10, in accordance with the color balance information retrieved from replaceable memory element 12. The resulting intensity signals are input to a cathode ray tube ("CRT") deflection and drive circuit 26, that also receives the necessary deflection, focus and vignette control signals via path 40 from CPU 10 in order to properly output an image on CRT 28.

In the alternate embodiment illustrated in FIG. 2, color balancing occurs after the CRT. In particular, an optical filter disk 42 is rotated, under the control of CPU 10, to separately image each of the red, blue and green portions of an image onto film plane 34. Filter disk 42 includes a separate red filter 44, green filter 46 and blue filter 48. The use of such a filtering system is well known in the art. A single amplifier 25 under the control of CPU 10 is provided in series with DAC 18 to amplify the image intensity information as required. Color look up table information from the replaceable memory element 12 will be interpreted by CPU 10 and used to control the exposure duration via each of the color filters 44, 46 and 48. The CRT 28 in this embodiment is a monochrome device.

Those skilled in the art will appreciate that other types of display devices are available and can be used instead of a CRT. In addition, a laser beam could be used to scan an image across a photographic film as well known in the art.

The image generated on CRT 28 is projected via conventional optics including a lens 30 onto a film plane 34 of a film transport 32. Film carried in film transport 32 will be exposed with the image in a conventional manner.

Replaceable memory element 12 can also be used to control the number of exposures that a user is entitled to in accordance with a prepayment made to the film recorder vendor or service bureau. Thus, for example, a user may purchase 1,000 exposures for a predetermined sum. Replaceable memory element 12 would maintain a running balance of how many exposures are left out of the 1,000 exposures purchased. Each time, an exposure is made, CPU 10 decrements the credit balance count in replaceable memory element 12 via interface 14. An exposure lock 38 is provided under control of CPU 10 to prevent a user from making additional exposures once the credit balance provided in replaceable memory element 12 has been used up. At this point, the user will be required to purchase additional exposures, at which time either a new replaceable memory element 12 would be provided or the existing replaceable memory element 12 would be reprogrammed with the new credit balance.

Replaceable memory element 12 can also be used to store diagnostic information pertaining to the operation of the film recorder. Diagnostic information is input to CPU 10 via terminal 36, from various sensors (not Shown) provided throughout the film recorder. If a user is experiencing problems with the film recorder, the replaceable memory element containing the diagnostic information can be forwarded to the factory or service bureau for analysis of the diagnostic information and ultimate repair of the film recorder. The replaceable memory element can also be periodically sent to the factory or service bureau for routine maintenance purposes, during which time the performance of the film recorder can be analyzed.

It should now be appreciated that the present invention provides a versatile replaceable memory element for a film recorder. An interface provides a data path between the film recorder central processing unit and a user accessible receptacle. The user replaceable memory element is inserted into the receptacle for communication with the central processing unit via the data path. This scheme allows simple upgrading of a film recorder to incorporate new features provided by the replaceable memory element. The replaceable memory element can also provide color look up tables for new film types, exposure credit information, and provide a diagnostic tool for the film recorder.

Although the invention has been described in connection with various specific embodiments thereof, those skilled in the art will appreciate that numerous adaptations and modifications may be made, without departing from the spirit and scope of the invention as set forth in the claims.

What is claimed is:

1. A film recorder comprising:
  a digital image generator;
  a central processing unit operatively associated with said digital image generator for controlling the generation of an image output from said image generator for recordal;
  a film transport;
  means for projecting an image from said image generator onto a film plane of said film transport;
  interface means for providing a data path between said central processing unit and a receptacle provided in said film recorder, said receptacle being readily accessible to a user via an opening in a housing of said film recorder;
  a user replaceable memory element adapted to be removably inserted into said receptacle for communication with said central processing unit via said data path during the regular use of said film recorder to record images, said memory element providing (i) read only storage of data relating to a type of film to be exposed by said film recorder and (ii) a read/write memory;
  a plurality of different sensors coupled to said central processing unit for monitoring the operation of said film recorder; and
  means for coupling said read/write memory contained in said user replaceable memory element to said data path for accumulating diagnostic information for said film recorder received over time from said central processing unit in response to said sensors during said regular use of said film recorder while said user replaceable memory element is inserted in said receptacle;
  wherein said diagnostic information is adapted to be read from said read/write memory when said user replaceable memory element is not inserted in said film recorder for analysis of said diagnostic information by means separate and independent of said film recorder and use in the maintenance of said film recorder.

2. A film recorder in accordance with claim 1 wherein:
  said user replaceable memory element contains a color look up table for a photographic film carried in said film transport; and
  said central processing unit accesses data in said color look up table to control the generation of said image output from said image generator.

3. A film recorder in accordance with claim 1 wherein:
  said user replaceable memory element contains read/write memory for storing credit balance information identifying a remaining number of film exposure credits purchased in advance by a user; and
  said central processing unit accesses said credit balance information to permit or deny a film exposure to said user;
  said replaceable memory element and credit balance information being separate and independent of the film to be exposed.

4. A film recorder in accordance with claim 3 wherein said central processing unit decrements a credit balance contained in said user replaceable memory element when a film exposure is made.

5. A film recorder in accordance with claim 2 wherein:
  said user replaceable memory element contains read/write memory for storing credit balance information identifying a remaining number of film exposure credits purchased in advance by a user; and
  said central processing unit accesses said credit balance information to permit or deny a film exposure to said user;
  said replaceable memory element and credit balance information being separate and independent of the film to be exposed.

6. A film recorder in accordance with claim 5 wherein said central processing unit decrements a credit balance contained in said user replaceable memory element when a film exposure is made.

7. A film recorder in accordance with claim 1 wherein:
  said user replaceable memory element comprises means for providing an optional feature in said film recorder; and
  said central processing unit communicates with said means for providing an optional feature to implement said feature.

8. A film recorder comprising:
  a digital image generator;

a central processing unit operatively associated with said digital image generator for controlling the generation of an image output from said image generator for recordal;

a film transport;

means for projecting an image from said image generator onto a film plane of said film transport;

interface means for providing a data path between said central processing unit and a receptacle provided in said film recorder, said receptacle being readily accessible to a user via an opening in a housing of said film recorder;

a user replaceable memory element adapted to be removably inserted into said receptacle for communication with said central processing unit via said data path-during the regular use of said film recorder to record images, said memory element providing a read/write memory;

a plurality of different sensors coupled to said central processing unit for monitoring the operation of said film recorder; and means for coupling said read/write memory contained in said user replaceable memory element to said data path for accumulating diagnostic information for said film recorder received over time from said central processing unit in response to said sensors during said regular use of said film recorder while said user replaceable memory element is inserted in said receptacle;

wherein said diagnostic information is adapted to be read from said read/write memory when said user replaceable memory element is not inserted in said film recorder for analysis of said diagnostic information by means separate and independent of said film recorder and use in the maintenance of said film recorder.

9. A film recorder in accordance with claim 8 wherein:

said user replaceable memory element contains a color look up table for a photographic film carried in said film transport; and said central processing unit accesses data in said color look up table to control the generation of said image output from said image generator.

10. A film recorder in accordance with claim 8 wherein:

said user replaceable memory element comprises means for providing an optional feature in said film recorder; and said central processing unit communicates with said means for providing an optional feature to implement said feature.

* * * * *